United States Patent
Norsten et al.

(10) Patent No.: US 7,541,426 B2
(45) Date of Patent: Jun. 2, 2009

(54) FLUORINATED COMB-SHAPED POLYMERS

(75) Inventors: Tyler B. Norsten, Gatineau (CA); Jianfu Ding, Ottawa (CA); Michael D. Guiver, Ottawa (CA); Yinghua Qi, Gatineau (CA)

(73) Assignee: National Research Council of Canada, Ottawa, Ontario (CA)

( * ) Notice: Subject to any disclaimer, the term of this patent is extended or adjusted under 35 U.S.C. 154(b) by 405 days.

(21) Appl. No.: 11/441,003

(22) Filed: May 26, 2006

(65) Prior Publication Data

US 2006/0270822 A1 Nov. 30, 2006

Related U.S. Application Data

(60) Provisional application No. 60/684,534, filed on May 26, 2005.

(51) Int. Cl.
*C08G 73/24* (2006.01)
(52) U.S. Cl. .................................................. 528/401
(58) Field of Classification Search ............... 525/132
See application file for complete search history.

(56) References Cited

U.S. PATENT DOCUMENTS 6,827,986 B2 * 12/2004 Asukabe et al. ............. 427/536
2005/0288483 A1 * 12/2005 Ding et al. .................. 528/401

OTHER PUBLICATIONS

Hickner, M. A. et al., "Alternative Polymer Systems for Proton Exchange Membranes (PEMs)"; *Chem. Rev.* 104, 4587-4612, (2004).
Kreuer, K. D,. "On the development of proton conducting membranes for hydrogen and methanol fuel cells"; *J. Membrane Sci.* 185, 29-39, (2001).
Karlsson, L. E. & Jannasch, P., "Polysulfone ionomers for proton-conducting fuel cell membranes: sulfoalkylated polysulfones"; *J. Membr. Sci.* 230, 61-70, (2004).
Ghassemi, et al., "New multiblock copolymers of sulfonated poly(4'-phenyl-2,5-benzophenone) and poly(arylene ether sulfone) for proton exchange membranes II"; *Polymer* 45, 5855-5862. (2004).
Yang, Y., et al., "Synthesis of sulfonated polysulfone-*block*-PVDF copolymers: enhancement of proton conductivity in low ion exchange capacity membranes"; *Macromolecules* 37, 1678-1681, (2004).
Ding, J., et al., "Enhanced conductivity in morphologically controlled proton exchange membranes:synthesis of macromonomers by SFRP and their incorporation into graft polymers"; *Macromolecules* 35, 1348-1355, (2002).
Quirk, R. P., & Wang, Y, "Anionic difunctionalization with 1,1-bis(4-*t*-butyldimethyislloxyphenyl)ethylene. synthesis of ω, ω-bls(phenol)-functionalixed polystyrene condensation macromonomers"; *Polym. Internat.* 31, 51-59, (1993).
Jannasch, P., "Fuel Cell Membrane Materials by Chemical Grafting of Aromatic Main-Chain Polymers"; *Fuel Cells*, 5, 248-260 (2005).

* cited by examiner

*Primary Examiner*—Randy Gulakowski
*Assistant Examiner*—Kyle Baumstein
(74) *Attorney, Agent, or Firm*—J. Wayne Anderson

(57) ABSTRACT

Fluorinated comb co-polymers have a main chain including a semi-rigid hydrophobic fluorinated poly(ether) backbone and comb segments in the form of flexible and monodisperse side chains that are more hydrophilic than the backbone. The side chains may be hydrophilic polymeric chains obtained from "living-type" polymerization, for example polymethacrylates, polyethylene oxides, polystyrenes. Hydrophilic functionality, for example, ionic groups may be selectively introduced onto the side chain post polymerization. The side chain may be sulfonated α-methyl polystyrene. Such polymers are useful in proton exchange membranes.

13 Claims, 4 Drawing Sheets

FLUORINATED COMB-SHAPED POLYMERS

CROSS-REFERENCE APPLICATIONS

This application claims the benefit of U.S. Application 60/684,534 filed May 26, 2005.

FIELD OF THE INVENTION

The present invention relates to fluorinated comb polymers and their use in proton exchange membranes.

BACKGROUND OF THE INVENTION

The development of sustainable and renewable energy conversion technologies is becoming increasingly important and economically more viable with respect to the current state of the fossil fuel-based economy. In particular, fuel cell technologies promise a combination of high energy conversion efficiency coupled with the potential for a large reduction in power source emissions. This stems from the fact that a fuel cell, unlike an internal combustion engine, is an electrochemical device capable of converting chemical energy in the form of hydrogen or alcohol-based fuels directly to electrical energy with little or no toxic discharge.

The development of a viable Proton Exchange Membrane Fuel Cell system (PEMFC) is currently being explored for a wide range of applications. Its successful integration into targeted industries, such as the automotive sector would have a favorable global environmental and economic impact. These fuel cells rely on a thin polymer membrane that functions as a solid ionic conductor moving electrochemically generated protons from the anode to the cathode. The membrane must also be impermeable to the fuel (typically hydrogen or methanol) thereby acting as a fuel separator preventing the unspent fuel from mixing with the sink-gas, i.e. oxygen in the air. The membrane must also act as an efficient insulator directing catalytically produced electrons through an external circuit enabling the power generated by the cell to be consumed by an external load. The physical and chemical attributes of the PEM must ensure: high proton conductivity, low electronic conductivity, low gas/fuel permeability, oxidative stability, thermal stability, hydrolytic stability, good mechanical properties, ease of processing and economical viability.

Nafion®, a perfluorinated ionomer initially developed for the chlor-alkali industry, is currently the material of choice for the PEMFC industry because of its commercial availability and demonstrated performance in fuel cells (e.g. excellent chemical and mechanical stability and high proton conductivity). However, Nafion® is quite costly to produce, has high fuel permeability to alcohol-based fuels such as methanol, and has a low operating temperature due to low mechanical integrity at higher temperatures and low to moderate glass transition temperature that are not ideally suited to many fuel cell applications. As a result, there is a great deal of interest in designing and developing new low cost polymer materials having superior properties targeted specifically to the PEMFC industry.

Substantial current research is aimed at designing and developing alternative polymer materials based on non-fluorinated or partially fluorinated polymeric systems. The majority of this work is based on non-fluorinated condensation polymers that contain ionic functionality randomly located along the polymer backbone. Generally these polymers can achieve suitable conductivity only at high ion exchange capacities (IEC) resulting in high water-up and large membrane dimensional changes that are unsuitable for practical PEM applications. It has been suggested that these sulfonated polymers are unable to form defined hydrophilic domains as the rigid polyaromatic backbone prevents co-continuous ionic clustering from occurring. Introduction of ionic pendant side chains or ionic blocks into these systems has shown promise in terms of materials performance, however the conductivity and membrane hydrodynamic properties typically remain lower relative to Nafion®.

On the other hand, Nafion® is a random copolymer comprised of a perfluorinated hydrophobic backbone that contains a number of short flexible pendant side chains with single hydrophilic sulfonic acid groups. It is this delicate balance of hydrophobic-hydrophilic properties within the material coupled with the increased mobility of the flexible ionic side chain that, in the hydrated form, leads to a co-continuous network of ionic channels through the material.

Microstructural analysis of Nafion® and other newly emerging materials has suggested that both chemical microstructure and nanoscale morphology of ionomer membranes can dictate material performance. Although the microstructure of Nafion® has been extensively examined, the exact structural morphology of Nafion® remains controversial and is not entirely understood. Furthermore, the limited number of chemical variations of Nafion® materials precludes a detailed systematic study linking polymer structure to material properties.

Microphase separation of block copolymers can be used to create well defined periodic microdomains of controlled morphology (e.g. cylinders, spheres, lamellae) on the nanoscale (10-100 nm). Microphase separation in block copolymers arises from the incompatibility between the different covalently linked blocks. The ability to control domain size and morphology results from the precise synthetic control over the relative block volume fractions and the polydispersity of each block. This typically limits the synthetic methodologies used for preparing these polymers to a limited number of monomers that can undergo living-type polymerizations.

Recently research has shown that comb polymers are also capable of creating unique and interesting nanoscale morphologies. Many of the fundamental rules that govern block copolymer microphase separation can be applied to comb polymers. This expands the possibilities of available synthetic methodologies to include some non-living polymerization techniques capable of producing functional polymers that can form microphase separated morphologies.

There remains a need for new polymeric materials that can be used in proton exchange membranes, particularly for the PEMFC industry.

SUMMARY OF THE INVENTION

According to one aspect of the invention, fluorinated comb polymers are provided.

According to another aspect of the invention, fluorinated comb polymers are useful in proton exchange membranes.

According to yet another aspect of the invention, a process for making fluorinated comb polymers is provided.

Fluorinated comb polymers comprise a main chain and side chains. The main chain preferably includes a fluorinated polymer backbone, preferably a semi-rigid fluorinated polymer backbone capable of creating mechanically durable high temperature membranes while providing a high degree of hydrophobicity and chemical stability. Preferably, little or no sulfonation on the backbone can occur during any post-sulfonation steps, resulting in reduced water uptake into the hydrophobic domains. One example of a suitable fluorinated polymer is a fluorinated poly(ether), e.g. a fluorinated poly (arylene)ether. The polymer backbone is preferably a co-polymer of a bisphenol and a fluorinated aromatic compound, for example a fluorinated biphenyl.

The side chains preferably include comb segments in the form of flexible and monodisperse side chains that are more hydrophilic than the polymer backbone. The side chains are preferably polymeric chains obtained from "living-type" polymerization. Hydrophilic side chains may comprise polymers having hydrophilic monomers (e.g. methacrylates or ethylene oxide), or may comprise polymers (e.g. polymethacrylates, polyethylene oxides, polystyrenes) having hydrophilic functionality (e.g. ionic groups) selectively introduced onto the side chain by a post polymerization reaction. Ionic groups may be, for example, sulfonic acid, phosphonic acid or carboxylate groups, preferably sulfonic acid groups. Polystyrene is preferably α-methyl polystyrene. Preferably, the flexible hydrophilic side chains are capable of microphase separation into a co-continuous ionic network.

The side chains may have one or more repeating units of the monomer, but are preferably reasonably long having 4 or more repeating monomer units, for example from 4 to 1000 repeating units or from 10 to 100 repeating units. In the case where a hydrophilic functionality (e.g. an ionic group) is introduced onto the side chain post polymerization, the side chain preferably contains multiple ionic groups. The combination of reasonably long side chains and multiple ionic groups increases ionic domain interconnectivity for providing better conductivity at low levels of hydration.

In one aspect of the present invention, fluorinated comb polymers have a structure given by formula (I):

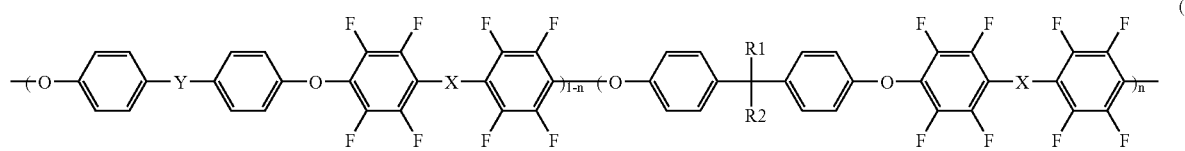

wherein n is a non-zero number between 0 and 1; Y is a single bond, —C(CF$_3$)$_2$— or —C(CH$_3$)$_2$—; X is a single bond, —C(O)—, —S(O$_2$)—, —S— or 2-oxa-4,5-diazolylene; R1 is H, CF$_3$ or a C$_1$-C$_8$ alkyl moiety; and R2 is polystyrene, polymethacrylate or polyethylene oxide. Preferably Y is —C(CF$_3$)$_2$—. Preferably X is a single bond. Preferably R1 is a C$_1$-C$_8$ alkyl moiety, more preferably methyl or t-butyl, even more preferably methyl. Preferably R2 is polystyrene functionalized with ionic groups. More preferably, R2 is α-methyl polystyrene functionalized with ionic groups. Even more preferably, R2 is α-methyl polystyrene functionalized with sulfonic acid groups.

Fluorinated comb polymers of formula (I) may be generally prepared as follows. A methacrylate, ethylene oxide or styrene monomer is polymerized using anionic polymerization techniques to produce a monodisperse living chain macromonomer. Length of the macromonomer may be controlled through initiator to monomer ratio. Living chains are capped with an appropriately functionalized bis-ether compound of formula (II) to form functionalized living chain ends:

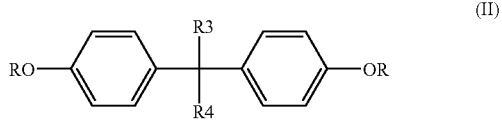

wherein R3, R4, or R3 and R4 together is a functional group that can react with a methacrylate, ethylene oxide or styrene moiety, the other of R3 or R4 when not together as a functional group is defined the same as R1 above, and R is a protecting group. Preferably, R3 and R4 together are a methylene (=CH$_2$) group, or R3 is defined as R1 above and R4 is a —CH$_2$Z group, where Z is Cl, Br, I or triflate. Preferably, R3 and R4 together are a methylene (=CH$_2$) group. R is preferably a t-butyldimethylsilyl (TBDMS) group.

Living chains having functionalized living chain ends so produced may be treated with methanol, for example, to yield hydrogen terminated macromonomers when it is desired that R1 be H, or with methyl iodide, for example, to yield methyl terminated macromonomers when it is desired that R1 be methyl. The protecting group R may be removed with a mild acid, for example dilute HCl.

End-capped living polymers produced as described above may then be reacted with compounds of formulas (III) and (IV):

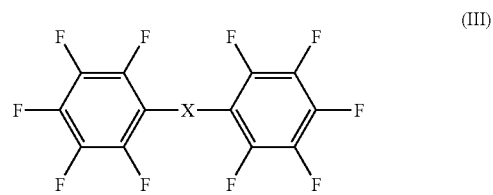

-continued

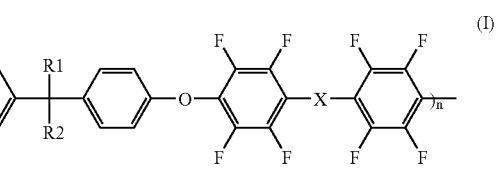

wherein X and Y are as described above, to produce comb polymers of formula (I) without functionalization with ionic groups. The reaction is preferably done in the presence of CsF or CaH$_2$/KF and a solvent at elevated temperature. The solvent is preferably dimethylacetamide (DMAc) or dimethylformamide (DMF).

Subsequently, ionic groups may be incorporated into the side chains of the comb polymer by reaction with an appropriate reagent. Sulfonations may be achieved, for example, with alkyl sulfates (e.g. acetyl sulfate), sulfur trioxide, oleum, etc. Carboxylations may be achieved, for example, with activated carboxylic acids. Phosphonations may be achieved, for example, with a mixture of phosphorous acid and either PCl$_3$, PCl$_5$ or POCl$_3$. Sulfonation with acetyl sulfate is preferred. Such reactions are preferably performed in an inert solvent (e.g. methylene chloride) and at elevated temperature.

Fluorinated comb-co-polymers of the present invention display excellent properties as PEMs materials. Specifically conductivity, membrane water management and thermal properties are all comparable or superior to Nafion®. Without being held to any specific mode of action, it appears that the unique polymer structure resulting in microphase separation between opposing domains (e.g. hydrophobic and hydrophilic) may be responsible for the excellent properties observed for the polymers of the present invention.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION OF THE INVENTION

Figure 1:
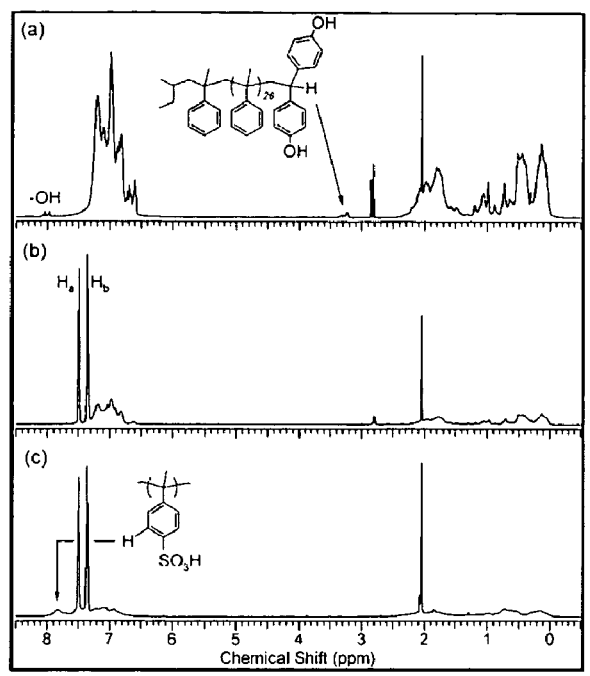
FIG. 1 is $^1$H NMR data in d-acetone of a) Mac H, b) comb-co-polymer 2a, and c) sulfonated comb-co-polymer 2.

Synthesis of Copolymers:

In order to obtain comb polymers with uniform and well-defined side chain lengths the side chains were prepared using anionic polymerization methods. Diphenylethylene (DPE) capping chemistry was then employed to produce end-functionalized macromonomers that could be subsequently copolymerized into the main chain polymer.

α-Methyl styrene may be readily polymerized using standard low temperature anionic techniques to produce monodisperse polymers. α-Methyl styrene was chosen as the monomer for the side chain because previous studies indicated that it was substantially more stable to oxidative attack than styrene-based materials due to the absence of the chemically labile α-hydrogens on the polystyrene backbone. The macromonomers were synthesized by modifying a previously reported procedure for the synthesis end-functionalized condensation macromonomers (Quirk, R. P.; Wang, Y. *Polym. Internat.*, 1993, 31, 51, the disclosure of which his herein incorporated by reference).

As per upper part of Scheme 1, α-methyl styrene was reacted at −78° C. in THF by adding s-BuLi to initiate the polymerization. The living chain-end was capped with the bis-tert-butyldimethylsilyl (TBDMS) DPE diether compound to produce the TBDMS-DPE functionalized living chain-ends. An aliquot of the DPE living polymer was then quenched with MeOH to produce a hydrogen terminated chain-end polymer (Mac H), while the remainder was quenched with iodomethane to produce the corresponding methyl terminated chain-ends (Mac). The hydrogen terminated polymer was useful in verifying the $M_n$ of the resulting end-capped polymer by $^1$H NMR, as will be discussed later, while quenching with iodomethane ensures that there are no labile α-hydrogens on the polymer backbone. Deprotection of the TBDMS groups under acidic conditions yields the active bis-phenol containing macromonomer. Length of the side chain was kept constant at approximately 26 repeat units which is an adequate length to ensure microphase separation between the main-chain and the comb segments. The length of the side chain can be controlled by varying the molar ratio of monomer to initiator in the polymerization process.

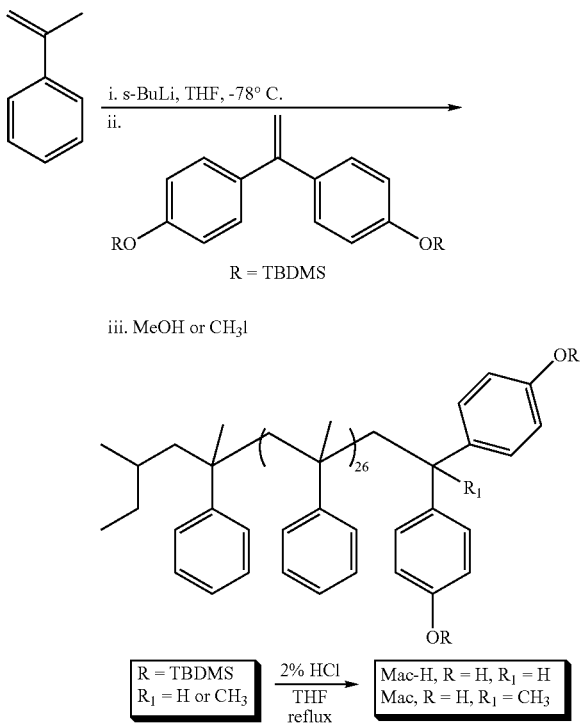

Scheme 1

-continued

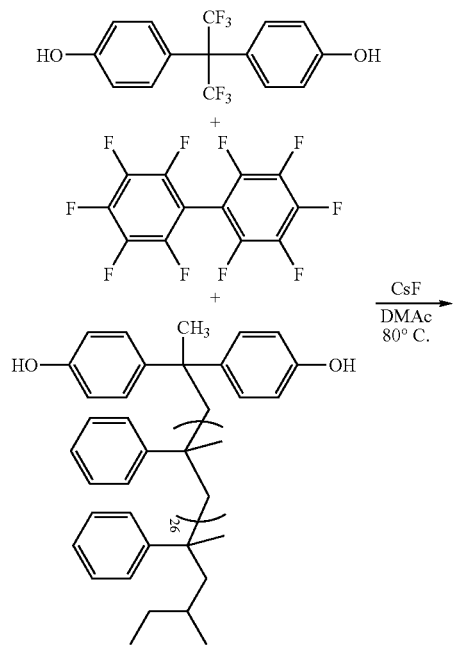

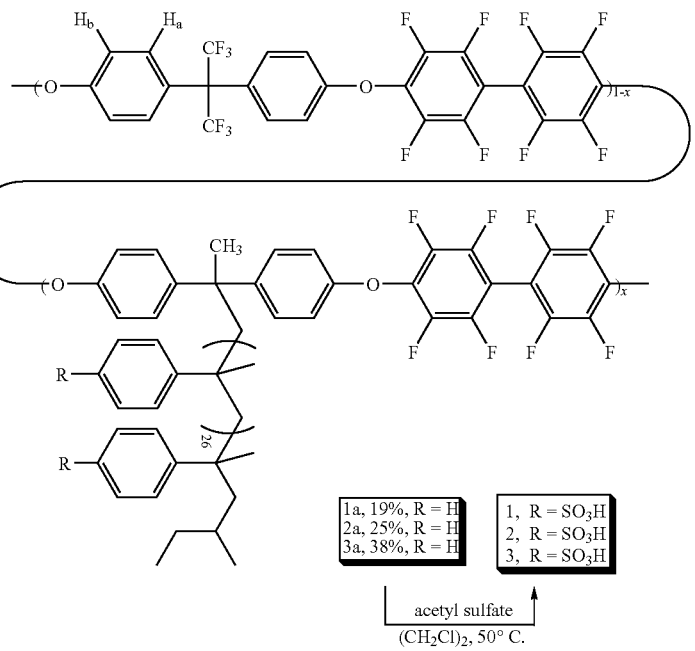

As per lower part of Scheme 1, the highly fluorinated copolymers according to the invention were produced by condensation copolymerization of a mixture of 6F-bisphenol A (6F BPA), decafluorobiphenyl (DFBF) and Mac in the presence of CsF in DMAc at (80° C.). Fluorinated monomers were used to prepare the polyaromatic backbone to impart a high degree of hydrophobicity to the main chain and drive the water into hydrophilic ionic containing side chain domains. The amount of side chain contained in the resulting copolymers could be accurately controlled by varying the feed ratio between 6F-bisphenol A and Mae. Copolymers containing side chain weight fractions of ~19% (1a), 25% (2a) and 38% (3a) were produced from incorporation of varying amounts of Mac.

It was important to ensure that sulfonation was selective to the α-methyl polystyrene side chains since random sulfonation along the backbone would produce a more homogenous distribution of ionic groups throughout the material and lead to ill-defined microphase separation. It was found that acetyl sulfate could be used to selectively sulfonate the side chains while leaving the aromatic main-chain virtually untouched. This was demonstrated by carrying out identical sulfonation reactions on fluorinated DFBF-6F-BPA polymers containing no α-methyl polystyrene side chain polymer where no sulfonation of the main chain was detected.

Characterization of Macromonomer and Copolymers:

NMR Analysis and $M_n$ Determination

The terminal benzylic hydrogen at about 3.2 ppm of Mac H (FIG. 1a) was used to determine the molecular weight of the macromonomer by integration against the remaining aromatic protons. The $^1$H NMR for Mae was nearly identical to Mac H in all respects apart from the absence of the benzylic resonance. The molecular weight obtained by $^1$H NMR for Mac H correlated closely to the number-average molecular weight ($M_n$) of both Mac H and Mac obtained by SEC analysis (Table 1) suggesting a high level of DPE capping of the living chain ends.

FIG. 1b shows a typical $^1$H NMR of non-sulfonated comb-co-polymers 1a-3a. The aromatic region of the spectrum displays a distinct para-substitution pattern of the 6F-BPA in the backbone ($H_a$ and $H_b$, Scheme 1) as well as incorporation of the broad aromatic and aliphatic resonances of the α-methyl polystyrene side chains. The molar ration of the side chain repeat unit present in the copolymers was determined by integrating the α-methyl polystyrene-based aromatic signals versus the isolated $H_a$ doublet of 6F-BPA. The molar ratios were then used to generate Mac weight percents presented in Table 1. The NMR-generated Mac weight percents were in agreement with near full incorporation of Mae based on the initial monomer feed ratios. The SEC curves of comb copolymers 1a-3a were all monomodal and showed an increase in $M_n$ as more Mac was incorporated into the backbone (Table 1).

The aromatic region of the sulfonated copolymers 1-3 (FIG. 1c) displayed the characteristic downfield shift (new broad resonance at about 7.8 ppm) due to the introduction of the sulfonic acid groups on the α-methyl polystyrene side chains. The sulfonated comb copolymers 1-3 were generally soluble in polar solvents such as DMSO and acetone, but were insoluble in polar protic solvents such as water and methanol.

TABLE 1

Selected Data for Comb Copolymers 1-3, Mac and Nafion ® 117

| Polymer | Mac content x/wt (%)[a] | sulfonate content[b] (%) | $T_g$ (° C.) | IEC[c] (meq/g) | $M_n$[e] (g/mol) | PDI[f] |
|---|---|---|---|---|---|---|
| N117 | | | | 0.96 | | |
| Mac | | | 145 | | 2810 | 1.09 |
| 1 | 0.044/19 | 78 | 185[d] | 0.87 | 67300 | 2.21 |
| 2 | 0.059/25 | 88 | 188[d] | 1.40 | 77300 | 2.02 |
| 3 | 0.099/38 | 82 | 192[d] | 1.75 | 105000 | 2.22 |

[a]Determined by $^1$H NMR analysis on the pre-sulfonated comb copolymers 1a-3a.
[b]Calculated from elemental analysis, [S(found)/S(calcd)] × 100, is a measure of sulfonate groups per α-methyl styrene unit.
[c]Ion exchange capacity determined by titration.
[d]Sodium sulfonate form.
[e]Values obtained from SEC measurements prior to sulfonation.
[f]Polydispersity index ($M_w/M_n$) obtained from SEC.

Thermal Analysis

Casting DMAc solutions of polymers 1-3 onto optically flat glass substrates produced mechanically flexible and transparent films. The glass transition temperatures ($T_g$) copolymers 1-3 were ambiguous due to large residual water endotherms. Even after extensive drying and additional scans, distinct $T_g$'s were not clearly discernible for the sulfonic acid form of copolymers 1-3. The sodium salt forms of copolymers 1-3, however, displayed a gradual increase in $T_g$ with increasing side chain content (Table 1).

Figure 2:
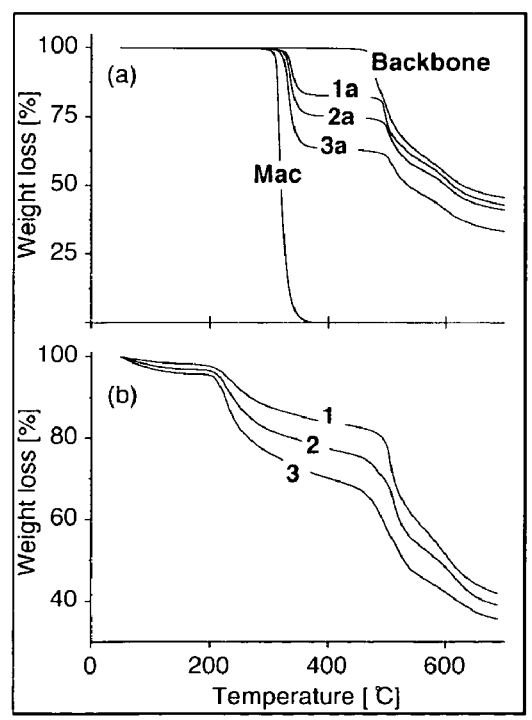
FIG. 2 is TGA traces for a) comb-co-polymers 1a-3a, backbone polymer containing no macromonomer and Mac, and b) sulfonated comb-co-polymers 1-3.

FIG. 2a shows the thermogravimetric curves for the backbone polymer, Mac and the copolymers 1a-3a. The onset weight loss temperature for the backbone polymer containing no side chain was about 465° C. As more side chain is introduced into the backbone the onset weight loss temperature systematically approaches that of Mac. It is also evident from the TGA traces that the side chain content can be determined by integration of the percent weight loss of the first step transition for polymers 1a-3a (FIG. 2a). The onset weight loss of the sulfonated copolymers 1-3 are generally 100° C. lower than the unsulfonated parent copolymers, likely due to the thermolysis of the sulfonic acid residues (FIG. 2b).

Figure 3:
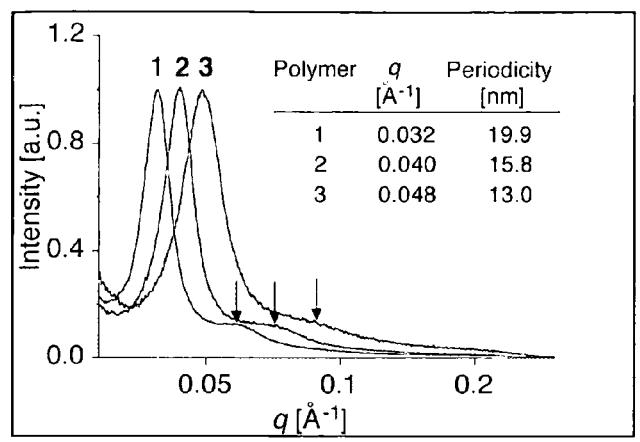
FIG. 3 is SAXS traces for lead stained comb-co-polymer membranes 1-3.

Morphological Studies: TEM and SAXS:

Casting DMAc solutions of comb copolymers 1-3 onto mirrored glass substrates produced mechanically flexible and transparent films approximately 80-100 μm thick. Small angle X-ray scattering (SAXS) was used to study modes of packing and periodicities between the microdomains of the comb copolymers. The membranes were soaked in a 0.5 M solution of lead acetate to selectively stain the ionomeric domains for SAXS and TEM analysis. As the amount of ionic side chain is increased from 19-38%, the q values corresponding to the first-order scattering peaks shift to larger values indicative of smaller domain periodicities (FIG. 3). Hence, the copolymers with higher ionic side chain contents yield narrower hydrophobic domains, resulting in smaller ionic domain periodicities as shown in Table 2 and FIG. 3. This demonstrates that the ability to control relative amount of side chain polymer affords direct control over the distance between alternating hydrophilic domains. The narrow peak profiles of the first order peaks for copolymers 1 and 2 indicate that the ionic domains are relatively uniform, while the broad first order peak for copolymer 3 suggests a wider distribution of domain periodicities. The SAXS profiles of the copolymers also display weak secondary scattering peaks suggesting a level of longer-range order within the materials.

TABLE 2

Ion Exchange Capacities and the Corresponding Equivalent Weights, and the SAXS Determined Ionic Domain Periodicities

| Polymer | IEC[a] (meq/g)/EW | Ionic Domain Periodicity (nm) |
|---|---|---|
| N117 | 0.96/1042 | |
| 1 | 0.87/1149 | 19.9 |
| 2 | 1.40/714 | 15.8 |
| 3 | 1.75/571 | 13.0 |

[a]Determined from acid-base titration.

Figure 4:
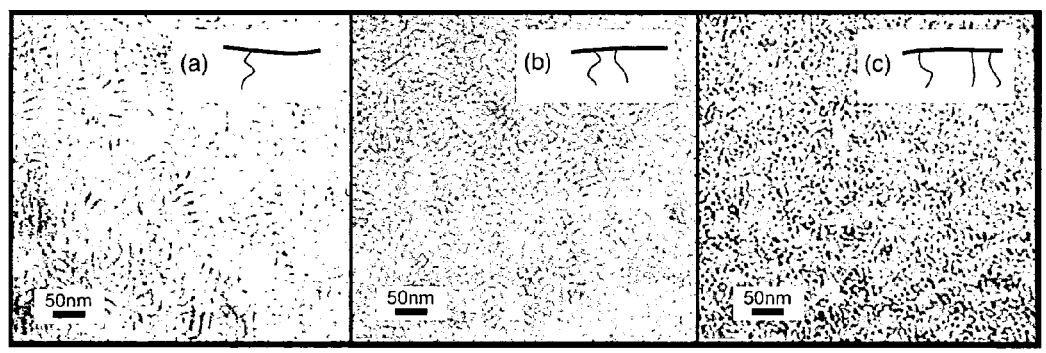
FIG. 4 is TEM micrographs a) 1, b) 2, and c) 3 of lead stained comb-co-polymer membranes.

The SAXS data is directly correlated to the TEM micrographs (FIG. 4) which clearly show an increase of ionomeric content (dark regions) on going from 19-38% side chain content and the systematic shrinkage of the hydrophobic regions (light regions). TEM also corroborates the SAXS data providing a picture of the microphase separated morphologies showing distinct ionic domain connectivity. The TEM for copolymer 1 clearly shows phase separated worm-like domains; the higher order reflection in the SAXS for copolymer 1 is the most well-defined in this series of copolymers, with the peak maxima located very near 2q, suggesting the existence of domains containing lamellar morphologies. Multigraft polymers with random junction point locations are known to be frustrated because different regions of the polymer prefer to form different morphologies as a result of the fluctuating local junction point density which leads to significant suppression of long range order. The lamellar domain shape, however, templates its own long-range order to a much greater degree than spheres or cylinders which have more freedom to form disordered packings while filling space to a uniform density.

The broadness inherent in the higher ordered SAXS peaks for copolymers 2 and 3 precludes definitively assigning specific microdomain morphologies to the structures. Nevertheless, TEM of copolymer 3 clearly appears to contain nano-sized spot-like structures consistent with a cylindrical domain shape, while the TEM of copolymer 2 contains morphological features inherent in the TEM's of both copolymers 1 and 3.

Membrane Water Management and Conductivity

Figure 5:
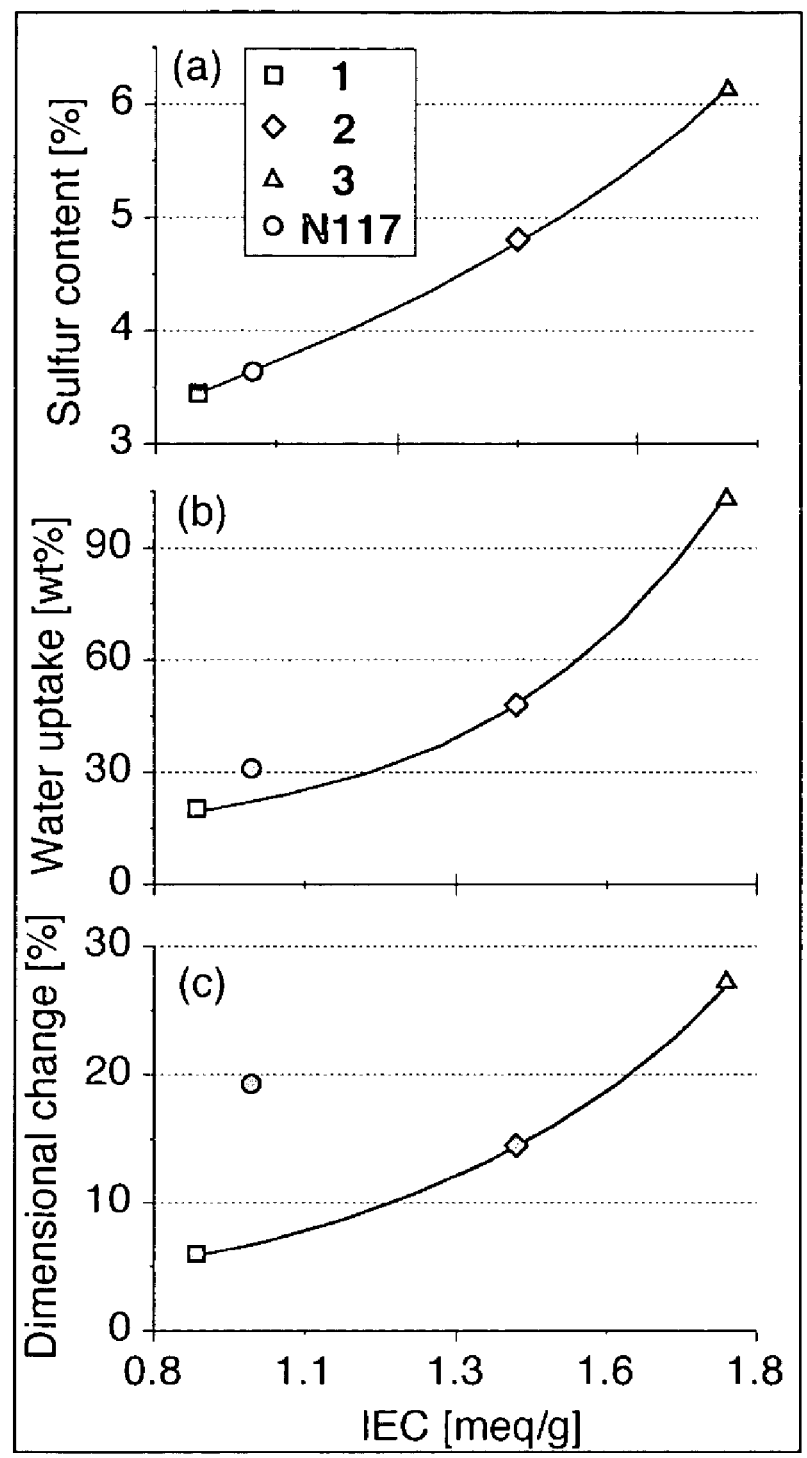
FIG. 5 is a) polymer sulfur content determined from elemental analysis, b) weight percent water uptake data at 80° C., and c) corresponding lengthwise dimensional change data at 80° C., as a function of ion exchange capacities for comb-co-polymers 1-3 and Nafion® 117.

Water management within the membrane is an important factor in the performance of PEM materials. Water is the main "vehicle" on which protons are transported through the membrane and as such it is required within the membrane to promote proton conductivity. However, excessively high levels of water uptake, can result in membrane dimensional change (swelling) leading to failures in mechanical properties, and in extreme cases, membrane solubility in water. Water uptake is typically a function of the degree of sulfonation or ion exchange capacity, which is a measure of exchangeable protons in the material. The ion exchange capacities of copolymer membranes 1-3 and Nafion® 117 were determined by titration and are listed in Table 2. Elemental analysis (EA) was used to determine the sulfur content for copolymers 1-3 and Nafion® 1117. FIG. 5a shows that as the sulfur content (sulfonic acid groups) is increased, there is a corresponding increase in the IEC values. Based on the EA and IEC values obtained for the comb copolymers it is estimated that between 80-95% of the α-methyl polystyrene groups on the side chains were sulfonated.

As the IEC increases, the weight percent water uptake also increases in a fairly monotonic fashion for copolymers 1-3 and Nafion® (FIG. 5b). Dimensional change as a function of IEC is significantly different for the comb polymers than Nafion®. At similar IEC values, Nafion® exhibits more than double the dimensional change compared with the comb copolymers (FIG. 5c). The comb copolymers therefore more efficiently compartmentalize water. This may be due to the unique polymer microstructure which serves to direct the water into the hydrophilic domains while the alternating hydrophobic domains serve to maintain structural and dimensional stability. This phenomenon is akin to covalent cross-linking of polymers to maintain membrane dimensional stability. However, in this case the polymer microstructure comprising alternating hydrophobic domains achieves the same goal based on the macromolecular self-assembly of the designed materials.

Figure 6:
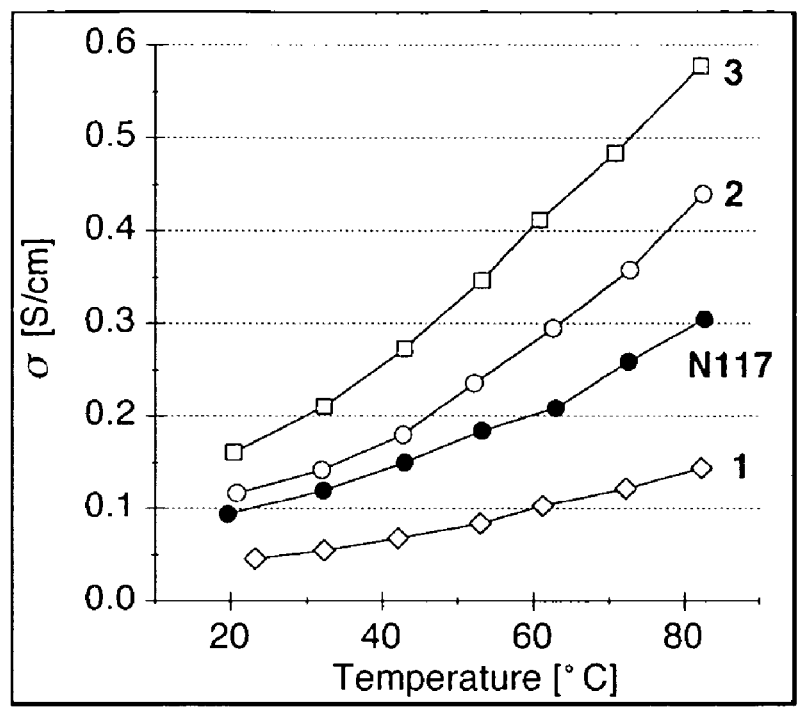
FIG. 6 is proton conductivity data as a function of temperature measured in water for comb-co-polymer membranes 1-3 and Nafion® 117; and, FIG. 7 is single cell polarization data for MEAs containing comb-co-polymers (MEA-2) and (MEA-3), and Nafion®-based MEA (MEA-1); 30° C. cell temperature, 0.1 L/min humidified $H_2$ and air, and ambient pressure.

FIG. 6 also shows that these comb-co-polymers display excellent proton conductivities over the temperature ranges studied. The increase in conductivity is correlated to the increase in side chain content and IEC values on going from polymers 1-3. The higher ionic side chain contents result in smaller backbone (hydrophobic) domains, as seen in the TEM and SAXS data. This ultimately results in larger and better connected ionic domains leading to the excellent conductivities observed for these materials.

Experimental Section:

Materials

Decafluorobiphenyl was purchased from Oakwood Products Incorporated and recrystallized from hexane twice. 6F-bisphenol A was purchased from Aldrich and recrystallized twice from toluene. THF for anionic polymerizations was distilled from purple benzophenone/sodium ketyl under dry argon. The α-methyl styrene was stirred over $CaH_2$ (in a flame dried distillation apparatus) for 24 h and vacuum distilled immediately before use. s-butyl lithium (Aldrich 1.4 M in hexanes) was used as received. Anhydrous grade DMAc was used for all condensation polymerizations. All reagent purifications and polymerizations were done under dry argon atmosphere using standard Schlenk techniques. All other solvents and reagents (obtained from Aldrich) were reagent grade and were used as received.

Anionic Polymerization

TBDMS macromonomer

The TBDMS protected diphenylethylene was prepared as previously described using a modified Wittig procedure (Quirk, R. P.; Wang, Y. Polym. Internat., 1993, 31, 51). A typical anionic polymerization consisted of charging a flame dried, septum sealed, evacuated 250 ml round bottom flask with 100 ml of THF. α-methyl styrene (10 g, 0.085 moles) was then introduced (via syringe) and the solution cooled to −78° C. in a dry ice acetone bath. A few drops of orange s-BuLi/α-methyl styrene solution were added to the reaction until a faint yellow color persisted. This kills any persistent water remaining in the solvent. The calculated amount of s-BuLi (3.6 mL, 0.005 moles) was then added to the reaction flask all at once via syringe. The orange/red solution was rapidly stirred at −78° C. for 20 minutes at which point a THF solution (15 mL) of (X) (2.16 g. 0.006 moles) was cannulated into the reaction mixture using reduced pressure. The mixture was allowed to react for 3 h at −78° C. at which point an aliquot was removed by syringe and quenched with degassed MeOH yielding the hydrogen terminated macromonomer. To the remainder of the reaction mixture was added MeI (1.3 g, 0.009 moles) producing the methyl terminated macromonomer. The mixture was allowed to warm to ambient temperature, precipitated into excess MeOH and dried in a vacuum oven.

Phenol Macromonomer

Deprotection of TBDMS group was achieved by refluxing the protected macromonomer in 2% HCl/THF solution for 24 h. The THF was removed under reduced pressure and residue polymer taken up in $CH_2Cl_2$. The organic layer was washed 3 times with 5% NaOH followed by 5% HCl and then a saturated brine solution. This removes any excess capping agent. The solution was dried over anhydrous magnesium sulfate, precipitated into excess MeOH and vacuum dried.

Condensation Copolymerization

A typical polymerization incorporating 25% macromonomer consisted of charging an argon purged 3-neck round bottom flask equipped with a thermometer with decafluorobiphenyl (401 mg, 1.2 mmol), 6F bisphenol A (370 mg, 1.1 mmol) and phenol macromonomer (252 mg, 0.09 mmol). DMAc (8 ml) and CsF (435 mg, 2.9 mmol) were then added to the flask which was gently evacuated under pressure and back filled with argon. The reaction was stirred at 80° C. for 16-20 h at which point the thick solution was filtered through a cotton plug and precipitated into an excess MeOH solution with rapid stirring. Small amounts of cyclic oligomers produced are removed by reprecipitating the polymer in a 1:1 mixture of acetone/MeOH.

Sulfonation of Copolymer

A fresh 1 M solution of acetyl sulfate was prepared before each sulfonation reaction by slowly adding 1.4 ml of sulfuric acid to a stirring solution of 3.8 ml of acetic anhydride dissolved in 20 ml of dichloroethane. A 3-5% solution of the co-polymer in dichloroethane was heated to 50° C. at which point an amount of acetyl sulfate (corresponding to 1.25 molar equivalents/per α-methyl styrene repeat unit) was added. After 1 h the solution becomes turbid and a gel like precipitate begins to form. After 4 h methanol was added to quench any remaining sulfonating reagent and the solvent removed under reduced pressure. The polymer residue was washed repeatedly with distilled water until the supernatant was of neutral pH. The sulfonated polymer was then dried for 24 h at 65° C. under vacuum.

Structural and Thermal Characterization:

NMR spectra were obtained on a Varian Unity Inova NMR spectrometer operating at a resonance frequency of 400 MHz for $^1$H and 376 for $^{19}$F. Deuterated acetone or deuterated dimethylsulfoxide (DMSO-d$_6$) were used as the NMR solvents. A trace of CFCl$_3$ was used as an internal standard for $^{19}$F measurements while TMS was used for $^1$H measurements. Molecular weights of all non-sulfonated polymers were determined by size exclusion chromatography (SEC) using a waters 515 HPLC pump, coupled with a Waters 410 differential refractometer detector and a Waters 996 photo-diode array detector operating at a wavelength of 260 nm. For the macromonomer, a set of Microstyragel columns (100, 500, 1000 Å) were used, while a different set of Microstyragel columns (10$^3$, 10$^4$, 10$^5$ Å) were employed for the co-polymer materials. All columns were calibrated with polystyrene standards bracketing the areas of interest in tetrahydrofuran.

A TA Instruments thermogravimetric analyzer (TGA) instrument model 2950 operating in high resolution mode was used for measuring decomposition temperatures (T$_d$). Polymer samples for TGA analysis were preheated to 150° C. at 10° C./min in either nitrogen or air and held isothermally for 40 min for moisture removal. Samples were then heated from 90° C. to 750° C. at 110° C./min for T$_d$ measurement. A TA Instruments differential scanning calorimeter (DSC) model 2920 calibrated with Tin at 231.93° C. and Zinc at 419.53° C. was used for measuring glass transition temperatures (T$_g$). The DSC measurements were conducted under a nitrogen atmosphere at a heating rate of 10° C./min.

Membrane Preparation:

An amount of sulfonated copolymer (0.45 g) was dissolved in 8 ml of DMAc and filtered through cotton plug that had been pre-washed with fresh DMAc. The solution was filtered directly onto a mirrored and leveled glass plate having a circular glass retaining wall (diameter=8 cm). The plate was placed inside a covered container and dried at 50° C. under a constant purge of argon for two-four days. The thickness of all membrane films ranged from 70 to 90 μm. Thicknesses were measured using a Mitutoyo digital micrometer.

Water Uptake and Swelling Ratios:

Membrane films were dried at 65° C. for 48 h prior to the measurements. After measuring the lengths (0.5 cm×5 cm) and weights of dry membranes, the sample films were soaked in deionized water for 24 h at predetermined temperatures. Before measuring the lengths and weights of hydrated membranes, the surface bound water was removed from the membrane by blotting the surface with a filter paper. The water uptake content was calculated according to eq 1:

$$\text{Uptake content}(\%) = \frac{\omega_{wet} - \omega_{dry}}{\omega_{dry}} \times 100\% \quad (1)$$

where $\omega_{dry}$ and $\omega_{wet}$ are the masses of dried and wet samples respectively. The swelling ratio was calculated from strips of films ~5 cm in length according to eq 2:

$$\text{Swelling ratio}(\%) = \frac{l_{wet} - l_{dry}}{l_{dry}} \times 100\% \quad (2)$$

where $l_{dry}$ and $l_{wet}$ are the lengths of dry and wet samples respectively.

Ion Exchange Capacity (IEC):

The IEC and EW of the membranes were determined by titration. A piece of membrane typically (4 cm×4 cm) in the acidic form was immersed in 40 ml of 2.0 M NaCl solution for 24 h. Solutions were titrated with 0.025 M NaOH solution to a phenolphthalein end point. After titration, the sample was rinsed with distilled water and dried under vacuum at 65° C. until a constant weight (48 h). The ion exchange capacity was calculated according to eq 3, where Ws is the dry weight (mg) of the sample and V$_{NaOH}$ and C$_{NaOH}$ are the volume (ml) and molar concentration of NaOH solution, respectively. EW was calculated from the IEC according to eq 4.

$$IEC(\text{meq/g}) = \frac{V_{NaOH} - C_{NaOH}}{W_s} \quad (3)$$

$$EW = \frac{1000}{IEC} \quad (4)$$

Conductivity:

All conductivity measurements were performed in the longitudinal direction in deionized Milli-Q water (18 MΩ resistivity). Membrane samples (20 mm×10 mm) were acidified in 2M HCl, rinsed thoroughly and soaked in distilled water for a minimum of 24 h before use. Variable temperature measurements were performed in a thermally controlled stainless steel vessel employing a two-electrode (platinum) ac impedance technique using a Solartron 1260 frequency response analyzer. Spectra were recorded between 10$^2$ and 10$^7$ Hz with 10 points per decade at a maximum perturbation amplitude of 100 mV. All conductivities (σ) were calculated using the relation a σ=d/RS, where d and S are the thickness and face area of the sample, respectively and R was derived from the low intersect of the high frequency semi-circle on the complex impedance plane with the Re(Z) axis. The impedance spectra were fitted on the basis of the equivalent circuit shown in eq 5 employing the corresponding instant fit function in the Zview 2.80 software by Scribner Associates Inc.

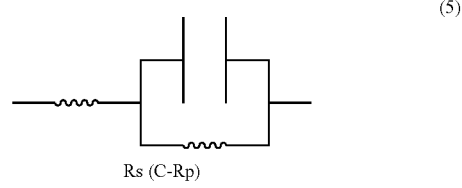

(5)

Rs (C-Rp)

Transmission Electron Microscopy (TEM):

Membranes in the sulfonic acid form were immersed in 0.5 M lead acetate solution for 48 h and rinsed with water in order to stain the ionic domains. A 1×5 mm strip was then cut from the membrane. The thin sample was embedded in polystyrene by placing the strip in a glass vial containing several polystyrene beads and heating at 120° C. until the PS completely embedded the sample. The glass vial was then shattered and the embedded polymer sample collected. Thin films (40-50 nm) of the embedded polymer samples were prepared using an ultramicrotome (Ultracut-E, Reichert-Jung). The slices were picked up with 400 mesh carbon coated copper grids for TEM analysis. The samples were analyzed using a Philips CM20 STEM equipped with a Gatan UltraScan 1000 CCD camera and INCA Energy TEM 200 EDX spectrometer operating at 120 kV.

Small Angle X-Ray Scattering (SAXS):

Cu Kα X-rays (1.54 Å) were generated in an Osmic Max-Flux source with a confocal multilayer optic (OSMIC, Inc). Images were taken with a Molecular Metrology, Inc., camera consisting of a 3 pinhole system, 150 cm sample-to-detector distance (calibrated using silver behenate), and a 2 dimensional, multiwire proportional detector (Molecular Metrology, Inc.). The entire X-ray path length was evacuated from the optic to the detector in order to reduce the background from air scattering. This setup allowed neglecting the correction for background scattering as proved by experiment. Two-dimensional images were reduced to one-dimensional form using angular integration. Scattering vectors (q) were calculated from the scattering angles (θ) using q=4π sin θ/λ, and domain periodicities (D) were calculated from Gaussian fits to the principal scattering maxima of the Lorentz-corrected intensities using D=2π/q.

Membrane Electrode Assembly (MEA):

Gas diffusion electrodes (GDEs) were fabricated by spray deposition of catalyst ink onto carbon paper (Toray, TGPH-060, containing 10 wt % polytetrafluoroethylene, ETEK). The catalyst ink was prepared by sonicating a mixture of 20 wt % Pt/Vulcan XC-72 (E-TEK, De Nora N.A. Inc.), ionomer solution (5 wt % Nafion® in alocohols/water or comb copolymer 2 in DMSO) and isopropanol for 90 minutes at room temperature. After spray deposition, the GDEs containing the polymer were floated on 0.5 M H$_2$SO$_4$ for 4 hours to remove trace DMSO impurities. The GDEs were subsequently dried for one hour at 80° C. The electrodes fabricated contained 0.4 mg Pt/cm$^2$ and 30 wt % ionomer (Nafion® or copolymer 2). Membranes were sandwiched between two GDEs (5 cm$^2$) from the same batch and the assembly hot-pressed at 135° C. (Nafion®) or 160° C. (comb copolymer 2) and 135 kg/cm$^2$ force for 90 s. MEAs were tested in a 5 cm$^2$ single cell fixture (Fuel Cell Technologies Inc.) using a fuel cell test station (Medusa, Teledyne Inc.) at 30° C. The gas inlets (H$_2$ and air) were humidified at 40° C. and supplied at a flow rate of 100 ml/min at ambient pressure. Before obtaining polarization data, the cell was equilibrated at the open-circuit potential (OCP) for about 2 hours with humidified H$_2$ and air. Following this, the MES was conditioned by operating at constant potential for 15 min in increments of 0.05 V from 0.75 to 0.60 V.

With comb copolymers 1-3 exhibiting unique microstructures and possessing suitable membrane characteristics with regards to thermal properties, water uptake, dimensional stability and proton conductivity, the performance of the comb polymers was explored in an operating fuel cell.

Copolymer 2 was selected for measurements due to its intermediate values of IEC, proton conductivity and corresponding high dimensional stability. Two membrane electrode assemblies (MEAs) were fabricated, MEA-2 and MEA-3, their compositions being listed in Table 3. An MEA containing Nafion® ionomer and Nafion® 115 membrane (MEA-1) was used for comparison.

TABLE 3

Compositions of MEAs used for PEMFC Evaluation

| Sample | Cathode (30 wt % ionomer) | Membrane | Anode (30 wt % ionomer) |
|---|---|---|---|
| MEA-1 | Nafion ® | Nafion ® 115 | Nafion ® |
| MEA-2 | Nafion ® | Copolymer 2 | Nafion ® |
| MEA-3 | Copolymer 2 | Copolymer 2 | Copolymer 2 |

Figure 7:
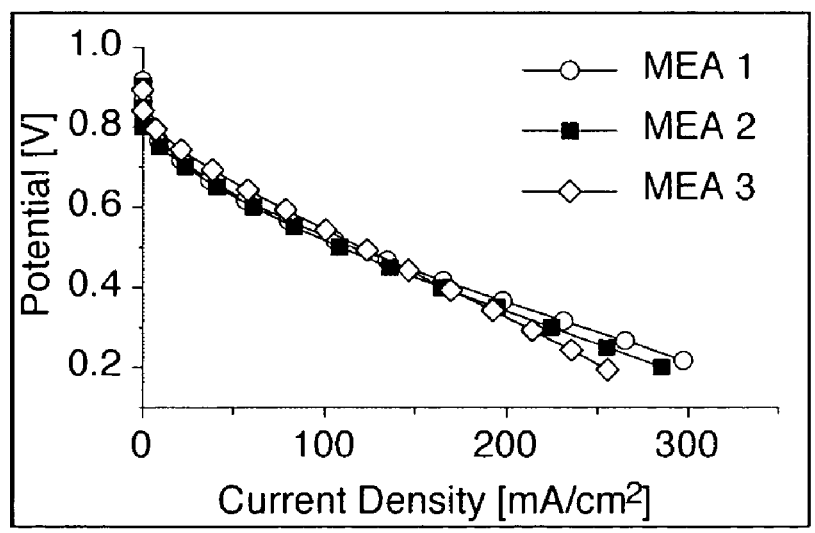

FIG. 7 shows the fuel cell performance for the MEAs. The polarization curves of MEAs containing sulfonated comb polymers exhibit similar performances to Nafion®-based MEAs, particularly in the kinetic (OCP –0.75 V) and Ohmic (0.75-0.40 V) regions. Under high current density conditions (0.40-0.20 V), a slight drop in performance is observed. In this region, high current density is limited by the transport of reactant gas to the catalytic sites. It is noteworthy that these results are based on MEA fabrication procedures that are optimized for Nafion®-based MEAs; and not optimized for the comb polymer MEAs. The high T$_g$ of the comb polymers would require higher hot-pressing temperatures than were used herein. Nevertheless, these results illustrate that the comb polymer MEAs can yield a fuel cell performance similar to that of Nafion®.

Other advantages which are inherent to the invention are obvious to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The invention claimed is:

1. Comb polymer of formula (I):

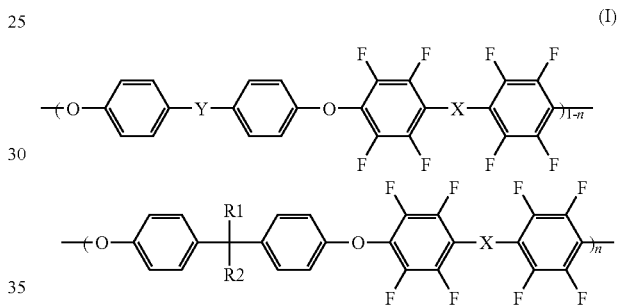

wherein n is a non-zero number between 0 and 1; Y is a single bond, —C(CF$_3$)$_2$— or —C(CH$_3$)$_2$—; X is a single bond, —C(O)—, —S(O$_2$)—, —S— or 2-oxa-4,5-diazolylene; R1 is H, CF$_3$ or a C$_1$-C$_8$ alkyl moiety; and R2 is polystyrene, polymethacrylate or polyethylene oxide.

2. Comb polymer of claim 1, wherein the monomeric unit is α-methyl styrene.

3. Comb polymer of claim 2, wherein the side chains have ionic groups incorporated therein.

4. Comb polymer of claim 1, wherein the polystyrene, polymethacrylate or polyethylene oxide comprise 4 or more repeating units.

5. Comb polymer of claim 1, wherein Y is —C(CF$_3$)$_2$—.

6. Comb polymer of claim 1, wherein X is a single bond.

7. Comb polymer of claim 1, wherein R1 is methyl.

8. Comb polymer of claim 1, wherein R2 is α-methyl polystyrene functionalized with ionic groups.

9. Comb polymer of claim 1, wherein R2 is sulfonated α-methyl polystyrene.

10. Comb polymer of claim 1, wherein Y is —C(CF$_3$)$_2$—, X is a single bond, R1 is methyl and R2 is sulfonated α-methyl polystyrene.

11. Comb polymer of claim 10, wherein the α-methyl polystyrene comprises 4 or more repeating units.

12. Proton exchange membrane comprising a comb polymer of claim 10.

13. Proton exchange membrane comprising a comb polymer of claim 11.

* * * * *